United States Patent [19]

Westermark

[11] Patent Number: 4,482,466

[45] Date of Patent: Nov. 13, 1984

[54] HEAT PUMPING PROCESS BASED ON THE PRINCIPLE OF ABSORPTION

[76] Inventor: Mats Westermark, Hörnåkersvägen 45, S-183 65 Täby, Sweden

[21] Appl. No.: 435,584

[22] Filed: Oct. 20, 1982

[30] Foreign Application Priority Data

Oct. 20, 1981 [SE] Sweden ............................. 8106195

[51] Int. Cl.³ .................... C09K 5/00; F25B 29/00; F25B 15/02
[52] U.S. Cl. ....................................... 252/69; 252/67; 252/70; 252/71; 423/305; 423/306; 423/309; 423/313; 165/63; 62/112; 62/235.1; 62/238.1
[58] Field of Search .................. 252/67, 69, 70, 71; 423/305, 306, 309, 313; 165/63; 62/112, 235.1, 238.1

[56] References Cited

U.S. PATENT DOCUMENTS 4,019,992 4/1977 Krueger ............................. 252/68
4,272,268 6/1981 Greiner ............................. 62/235.1

OTHER PUBLICATIONS

Daniels, F., *Direct Use of the Sun's Energy*, New Haven and London, Yale University Press, 1964, pp. 145–146.
Raldow, Ed., *New Working Pairs for Absorption Processes: Proceedings of a Workshop in Berlin*, Swedish Council for Building Research, 1982.

*Primary Examiner*—Paul Lieberman
*Assistant Examiner*—Robert A. Wax
*Attorney, Agent, or Firm*—Pollock, Vande Sande & Priddy

[57] ABSTRACT

Phosphoric acid, especially orthophosphoric acid, is employed as the absorption medium in an absorption heat pumping system using water as its working medium. The acid may contain additions of corrosion inhibitors and/or boiling point elevating agents if desired.

11 Claims, 2 Drawing Figures

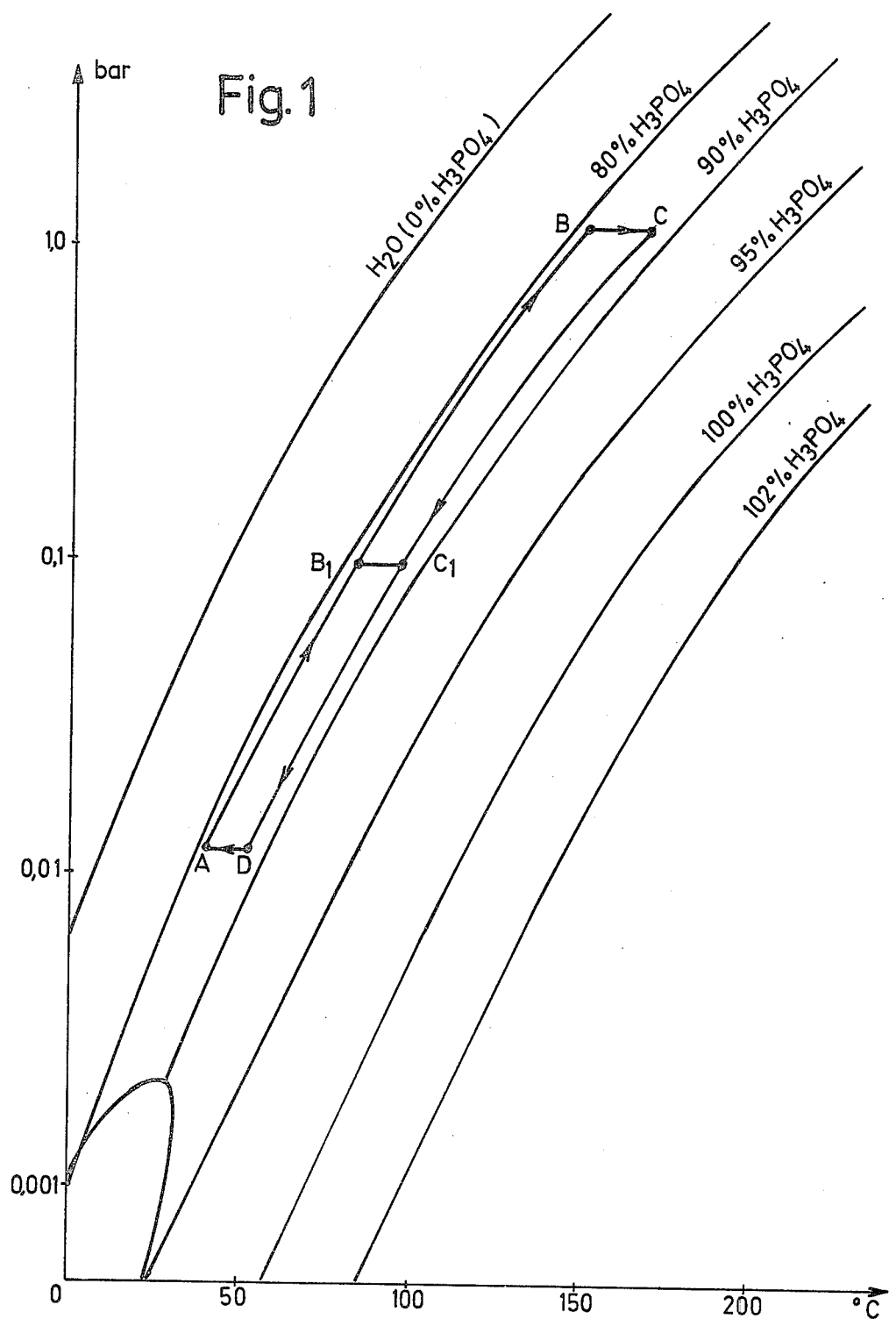

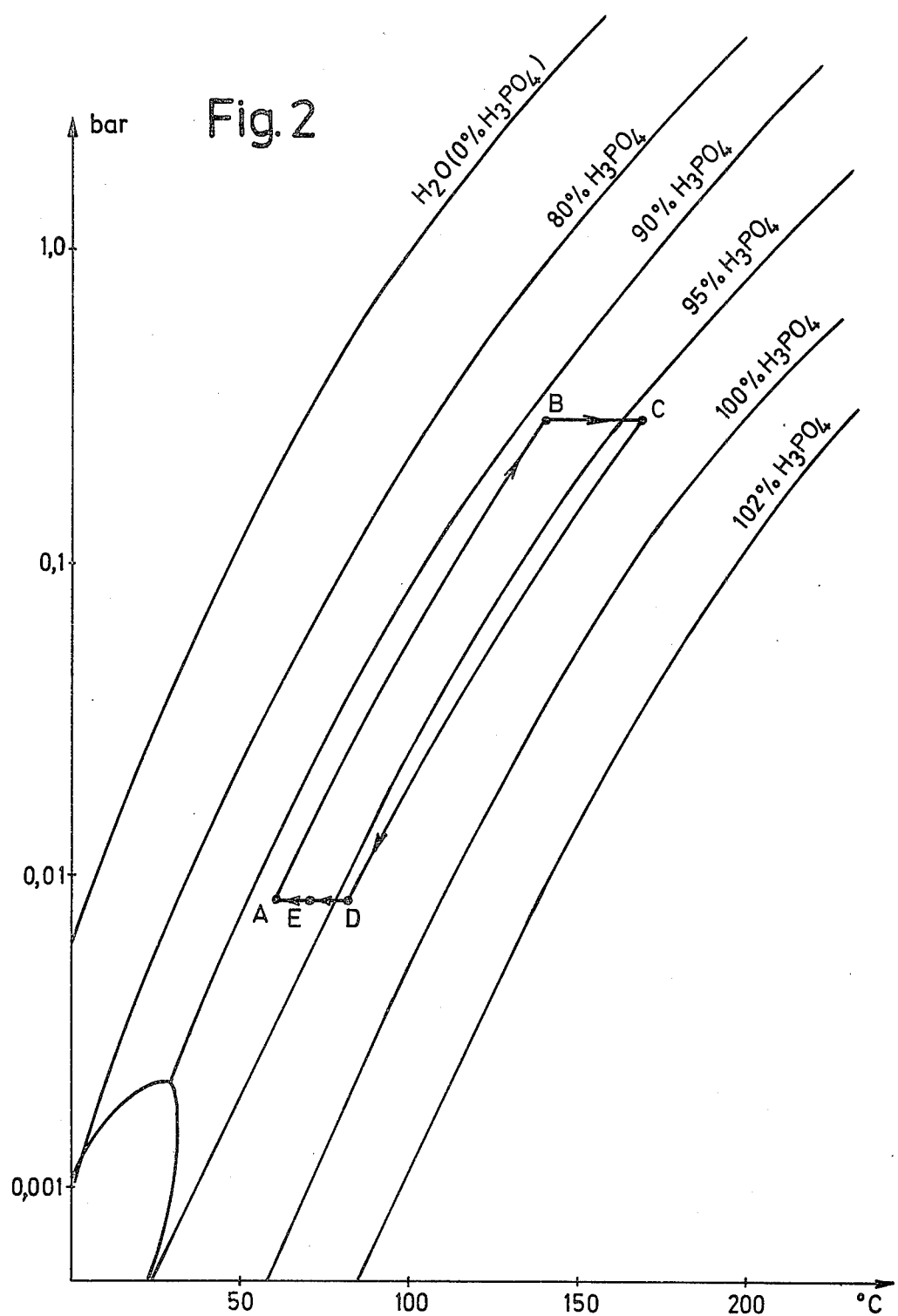

HEAT PUMPING PROCESS BASED ON THE PRINCIPLE OF ABSORPTION

This invention is concerned with a process for heat pumping based on the absorption principle and operating with water as its working medium.

By definition a heat pump will convert low temperature heat to useful heat of a higher temperature. This requires a supply of power in the form of mechanical energy or heat energy. Up to now it has been common practice, both for heating purposes and for cooling purposes, to employ mechanical heat pumps which require mechanical power for operation; but in some cases absorption heat pumps are employed, these pumps being heat operated, for instance by using heat obtained from steam or flue gases.

Since energy costs have been rising for a number of years heat pumps have become increasingly economical, for example for heating rooms and other indoor premises. A disadvantage of mechanical heat pumps is that the power necessary for their operation has to be valuable mechanical power derived either from electric motors or from diesel engines. It appears that the costs of both electric power and oil will sharply rise in the future, and in view of this prospect it may be worthwhile to consider the expedient of using absorption heat pumps which allow for a broader choice among different sources of power for their operation. For example, wood chips, peat, coal etc. may be employed as a fuel providing the necessary driving power. However a disadvantage inherent in the absorption heat pumps hitherto employed is their low heat factor; this is significantly lower than the heat factor of mechanical heat pumps. The "heat factor" is here defined as being the ratio of the recovered amount of heat to the amount of energy supplied for operation of the pump. Furthermore, difficulties may arise in achieving sufficiently high temperatures in e.g. remote heating systems (municipal heating networks etc.).

Originally heat pumps of the absorption type have been utilized substantially only for cooling purposes: To obtain a cool (air-conditioned) indoor atmosphere the pair of media employed have been most commonly, water and lithium bromide; for more vigorous refrigeration the pair of media employed have mainly been ammonia and water. But in view of the rising energy prices during the last years it has now become economically sound to also produce heat by means of an absorption heat pump; and consequently several apparatus manufactures are developing adaptations of known media and equipments to this entirely new temperature range. Preparatory experiments are also under way for employing water and sulfuric acid as the heat pump media, this pair of media being a useful means for chemical heat storage because sulfuric acid is a cheap material.

If absorption heat pumps are to be used for heating e.g. houses in residential areas the following four requirements should be fulfilled:

(1) Sufficient pumping height (temperature level difference), implying that the heat pump should be able to take up low temperature heat at about 0° C. and raise the temperature to 60°-70° C. in order to be capable of providing heat to a central heating network;

(2) High heat factor so as to minimize the consumption of power in operation;

(3) Low hazard media and equipment: the medium should be as harmless as possible and should not be capable of leaking out into the environment;

(4) Maximum chemical stability and minimum corrosiveness of the medium.

When reviewing the absorption systems of known heat pumps in the light of these requirements one will note the following: If the lithium bromide and water system is employed the temperature increase obtainable is only about 30° C. Unfortunately this is too low for most applications. Such a system will be useful only in cases where, for instance, a 30° to 40° surplus heat (waste heat) is available and is to be raised to say 60°-70° C. by the pumping operation. It may be noted, though, that this absorption medium does present a high heat factor, about 1.65, furthermore a low hazard, and acceptable corrosion properties.

The known ammonia+water system while satisfying the requirement of a 60°-70° C. pumping height has a low heat factor of only about 1.3-1.4; and this medium may be said to be fairly hazardous—in view of the fact that ammonia has a working pressure of about 20-40 bars. This means that if a breakdown occurs ammonia is liable to escape into the environment, and since the ammonia is then in its gaseous state it cannot be collected but will spread with the winds. Although corrosion problems are negligible if ammonia is employd the equipment will nevertheless have to be an expensive one since its dimensions must be such as to be suitable for high operational pressures.

The absorption system using sulfuric acid and water has a sufficient pumping height and a high heat factor of about 1.70. But sulfuric acid has obvious drawbacks inasmuch as it gives rise to major corrosion problems and is rather volatile. At the temperatures prevailing in the generator it is necessary to employ heat exchangers of glass or impregnated graphite. Due to the volatility of sulfuric acid, gases containing this acid will be liberated if leaks occur in the generator cycle. These gases may cause damage immediately, affecting the lungs of the personnel. Presumably, therefore, authorities will be reluctant to adopt the sulfuric acid+water system in view of its hazardous environmental implications in larger scale operations.

Consequently the absorption heat pump system in order to become better suited to its new purpose of heat production will need a better absorption medium: that is, a medium giving a high raise in temperature and a high heat factor without being excessively corrosive or hazardous.

It is an object of the present invention to provide a process for heat pumping according to the absorption system which largely avoids the drawbacks involved with the earlier types of absorption media employed. This is achieved according to the invention substantially in that the absorption medium employed is phosphoric acid, especially orthophosphoric acid, optionally with an addition of corrosion inhibitors and/or boiling point elevating agents.

Careful investigations have shown that with the phosphoric acid and water absorption system according to the invention it is possible to obtain heat factors of about 1.7 to 1.9 when an ordinary one-step evaporation is performed in the generator, while in the case of two-step evaporation the heat factor attainable will be about 2.3 to 2.5. This is much more advantageous than the conditions prevailing in the known systems, and is beneficial to the economy of operation. Moreover the solubility of phosphoric acid in water is so good that the temperature difference between the hot side and the cold side can be increased, if necessary, to at least 70° C. The absorption medium moreover has the advantage of being readily available, of being cheap and of involving little fire hazard; furthermore there is normally no risk that crystals will precipitate, since even a 100% phosphoric acid is in a liquid state at temperatures above +39° C. The phosphoric acid normally employed has a less than 100% concentration and therefore has an even lower melting point.

Using the term "phosphoric acid" in this context means that the mixture of absorption media contains orthophosphoric acid ($H_3PO_4$) as its main component plus optionally boiling point elevating agents and water in proportions suitable for providing a desired degree of boiling point elevation. A suitable phosphoric acid concentration is between 70% and 100%, preferably 90% to 100%. The phosphoric acid employed may be either orthophosphoric acid alone or mixtures of orthophosphoric acid and polyphosphoric acid. The boiling point elevating agent may be sulfuric acid in proportions of preferably 1% to 25%, or salt soluble in phosphoric acid (dihydrogen phosphates). These latter are in the first place salts of ammonia and alkali metals. It is moreover advisable to add corrosion inhibitors in order to minimize the corrosiveness of the medium. The main component of the medium in the evaporator (working medium) is water; optionally this working medium may contain additions of freezing point depressants and corrosion inhibitors.

In terms of physics, the good absorption medium properties of phosphoric acid may be explained as being due to the extremely low heat of dilution (dilution enthalpy) prevailing within the concentration range through which the medium has to pass during a working cycle.

The heat of dilution affects the amount of energy consumed in the evaporation process and thus also affects the heat factor. A substance giving off heat when diluted, e.g. sulfuric acid, requires the corresponding extra amount of heat when it is being concentrated. Phosphoric acid on the other hand has the property of generating very little heat when it is diluted from 100% $H_3PO_4$ to 70% $H_3PO_4$ (this being the concentration range considered to be of interest in heat pumping contexts). Consequently, when a given amount of steam is to be stripped off from a solution of phosphoric acid by evaporation of the solution the heat required is substantially only the heat of vaporization. As against this the systems employing sulfuric acid or lithium bromide or ammonia require major amounts of extra energy due to the considerable heat of dilution and heat of dissolution inherent in these systems. Therefore, when the pair of media employed are phosphoric acid+water the resultant heat factors will be higher than in the older known systems. This pair of media is very satisfactory also in respect of other important parameter requirements such as good solubility of the acid, high boiling point elevation, good chemical stability and low volatility.

As regards the boiling point elevation parameter it can be shown that a 30° and 70° C. elevation will occur at 80% and 95% by weight of $H_3PO_4$ respectively. In principle it is possible to employ solutions of up to 100% $H_3PO_4$ corresponding to an about 110° C. boiling point elevation. The surprisingly high degree of boiling point elevation obtained at phosphoric acid concentrations of between 90% and 100% means that heat at 60° to 80° C. or higher can be generated also from readily available low temperature sources (water, ambient outdoor air etc). This is a major advantage over the water and lithium bromide system in which the temperature raise obtainable is often too small to permit the utilization of low temperature sources with a temperature range of plus 0°–20° C. In this respect, the system of the present invention is much more advantageous than the system employing lithium bromide and water.

In order to obtain high heat factors the generator portion is sometimes operated as a multistep evaporation unit, that is, involving two or more evaporation steps. The steam stripped off in one step is utilized for evaporating the working medium from (an) adjacent step(s). In such an embodiment of the process the low heat of dilution of phosphoric acid constitutes a particularly great advantage over other media inasmuch as it will provide energy savings in all (both) of the evaporation steps.

Salts of iron, arsenic, copper are examples of corrosion inhibitors for phosphoric acid which may be employed to give a good protection from corrosion on e.g. stainless or acid-resistant steels in heat exchanger equipment. Good results may also be obtained with additions of organic nitriles or $C_6$–$C_{20}$ primary amines together with iodide salts or iodate salts.

Various commercially available materials may be used as freezing point depressants and corrosion inhibitors in the water phase; examples of these are glycol and chromic acid respectively. It is important, however, that these materials be non-volatile substances. Also phosphoric acid in concentrations of up to 60%, preferably 10% to 30%, is a very useful freezing point depressant.

The phosphoric acid system may be employed for many different purposes in connection with heat pumping or refrigerating processes. The phosphoric acid system can be used within the temperature range of from about −10° C. to about +300° C., with temperature raisings of up to about 100° C. The attached FIGS. 1 and 2 of the drawing are diagrams showing examples of operations where the system of the present invention is particularly advantageous. FIG. 1 illustrates conditions that may be encountered when the medium is used in a refrigeration apparatus having a two-stage generator (two-step evaporation generator). Evaporation is assumed to take place at +10° C. and absorption is assumed to take place at +30° C. In the hottest generator stage evaporation proceeds as indicated by points A-B-C-D in the diagram. In the colder generator stage evaporation proceeds as indicated by A-$B_1$-$C_1$-D.

FIG. 2 shows an example where the medium is employed in a heat pump with two-step absorption in the absorber. Evaporation is assumed to take place at +5° C. The hottest absorber stage produces heat at 70° C. (point E) while the colder absorber stage operates at 60° C. (point A). Evaporation is carried out in one step and proceeds as indicated by the points A-B-C-D.

In actual practice the process of the invention may be performed using essentially the same technical equipment as that employed for the lithium bromide plus water system. Appropriate consideration will however be given to the choice of materials in parts exposed to contact with liquid, as well as to constructional details.

In the process of the present invention special advantages are obtained—high heat factor or high refrigeration factor—if the generator is of the multi-stage type (two or more steps of evaporation). A generator portion equipped for two-step evaporation is known in connection with the lithium bromide+water system. It will give a refrigeration factor of about 0.99 as compared to 0.65 in the case of single-step evaporation; this means that in the case of two-step evaporation the refrigeration obtained is increased by about 52%. When the phosphoric acid system is employed the refrigeration factor under comparable conditions of temperature will be increased to 1.55 as compared to 0.88 in the case of single-step evaporation. Consequently here an about 76% increase of refrigeration can be attained by choosing the two-step procedure. It will thus be noted that the combination of phosphoric acid and two-step evaporation provides special advantages, due to the fact that phosphoric acid has a low dilution enthalpy. As regards commercial considerations, these will have to weigh the increased cost of two-step evaporation against the energy savings obtained: It will then be readily apparent that the economical prospects for two-step evaporation are particularly good if the present phosphoric acid system is employed.

What I claim is:

1. An absorption heat-pumping process in a closed system which comprises:
   (a) evaporating water at reduced pressure;
   (b) absorbing heat in a phosphoric acid absorption medium at a first temperature and first pressure in the form of said water evaporated at reduced pressure from (a); and,
   (c) subsequently evaporating water from the phosphoric acid medium at a higher pressure than said first pressure and at a higher temperature than said first temperature to thereby convert low temperature heat to heat of a higher temperature.

2. The process of claim 1 wherein said phosphoric acid is orthophosphoric acid.

3. The process of claim 1 wherein said absorption medium also contains a member selected from the group of corrosion inhibitors, boiling point elevating agents, or mixtures thereof.

4. The process of claim 1 or 3 wherein said phosphoric acid has a concentration of 70%–100%.

5. The process of claim 4 wherein said phosphoric acid is orthophosphoric acid.

6. The process of claim 1 wherein said phosphoric acid has a concentration of 90%–100%.

7. The process of claim 6 wherein said phosphoric acid is orthophosphoric acid.

8. The process of claim 3 wherein said phosphoric acid has a concentration of 90%–100%.

9. The process of claim 8 wherein said phosphoric acid is orthophosphoric acid.

10. The process of claim 3 wherein the phosphoric acid contains sulfuric acid as a boiling point elevating agent.

11. The process of claim 3 wherein the phosphoric acid contains as a boiling point elevating agent a phosphoric acid soluble member selected from the group of dihydrogen phosphate of ammonium, dihydrogen phosphate of alkali metal or mixtures thereof.

* * * * *